May 12, 1942.   L. O. GUNDERSON   2,282,776
FEED WATER AND BLOW-OFF SYSTEM FOR BOILERS
Filed March 11, 1940   2 Sheets-Sheet 1
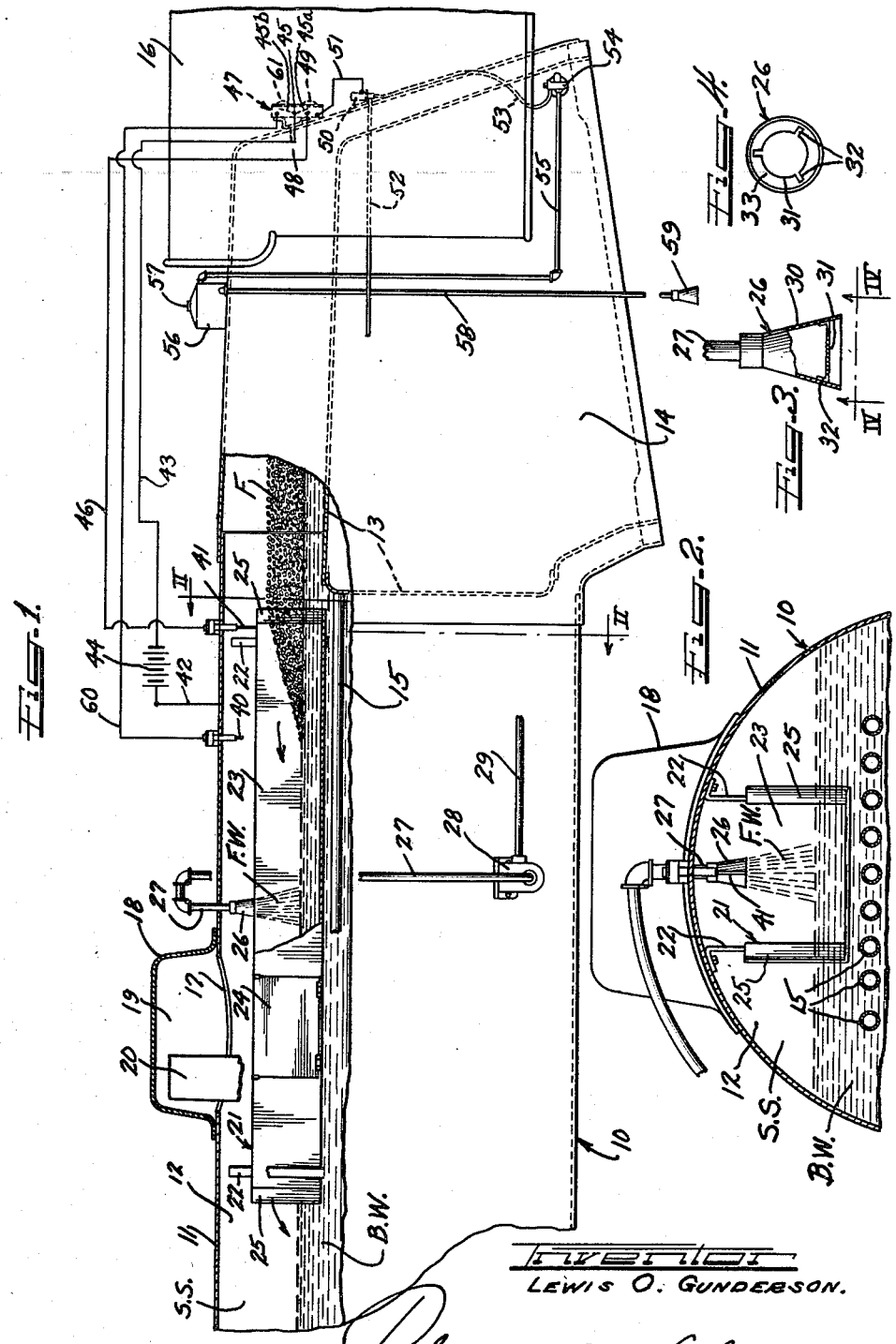
Inventor
LEWIS O. GUNDERSON.
by Charles N. Mills Atty.

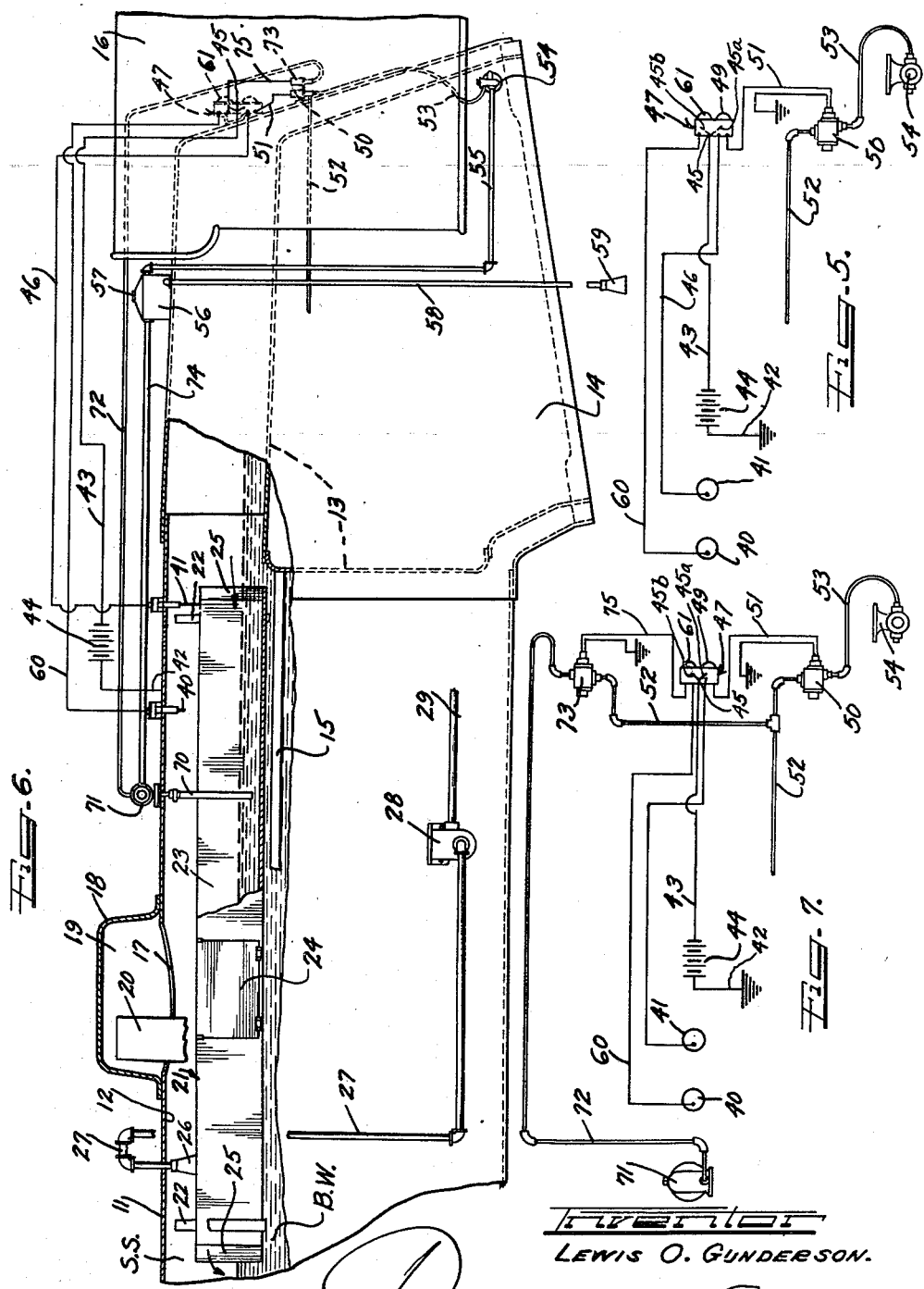

Patented May 12, 1942

2,282,776

UNITED STATES PATENT OFFICE 2,282,776

FEED WATER AND BLOWOFF SYSTEM FOR BOILERS

Lewis O. Gunderson, Park Ridge, Ill., assignor to Electro-Chemical Engineering Corporation, Chicago, Ill., a corporation of Delaware Application March 11, 1940, Serial No. 323,370

6 Claims. (Cl. 122—436)

This invention relates to the collapsing of foam and light water in an operating steam boiler as it flows along a localized course in the boiler and the delivery of all or part of the collapsed material back to the main body of boiler water in intimate mixture with added feed or make-up water.

A feature of the invention includes the introduction of the boiler feed water into the localized course for rapid mixture with the water flowing along the course.

Another feature of the invention includes automatic foam indicating devices and blow-off devices actuated by increases in level of the material flowing along the localized course.

According to this invention an open ended trough is mounted in the steam space of the boiler in communication at its open ends with the light water and foam developed on top of the main body of boiler water in an operating steam boiler. The trough preferably has considerable length and is positioned in the boiler so that its open ends receive and discharge light water flowing by virtue of currents normally established in the operating boiler.

The invention will hereinafter be described in connection with steam locomotive boilers, but it should be understood that the invention is adapted for use on any type of stationary or moving steam boiler.

It is, then, an object of the invention to provide a localized path for foam and light water in an operating steam boiler.

Another object of the invention is to provide an open ended elongated trough in the steam space of a boiler for collapsing foam and light water in the boiler, and for delivering a more solid water back to the main body of boiler water in the boiler.

A further object of the invention is to inject feed water into a boiler at a point where it will intimately mix with a localized flowing current of boiler water containing a maximum concentration of electrolytes including alkalies to precipitate or flocculate scale forming ingredients from the boiler water.

A further object of the invention is to temporarily segregate, from the main body of boiler water, a flowing stream of light water and foam and to spray feed water into this flowing stream.

Another object of the invention is to effect a rapid transition of the pH value of feed water to an increased pH value and thereby minimize the adsorption of organic substances on dispersed matter in the boiler, thus reducing the foaming tendencies of the boiler water.

Another object of the invention is to effect, in the boiler, a rapid heating of feed water to boiler water temperature for preventing temperature stratification in the boiler.

Other and further objects of the invention will become apparent to those skilled in the art from the following detailed description of the annexed sheets of drawings which disclose the invention in preferred forms embodied in locomotive boilers.

On the drawings:

Figure 1 is a fragmentary side elevational view, with parts broken away and shown in vertical cross section, of a locomotive boiler equipped with a light water and foam passageway receiving feed water therein and also equipped with automatic blow-off devices actuated by light water level in the localized passage.

Figure 2 is a fragmentary vertical cross-sectional view, with parts shown in elevation, taken along the line II—II of Figure 1.

Figure 3 is an enlarged side elevational view, with a part broken away and shown in vertical cross section, of a feed water spray device used in this invention.

Figure 4 is a bottom plan view of the spray device shown in Figure 3 taken along the line IV—IV of Figure 3.

Figure 5 is a diagrammatic plan view and wiring diagram of the electrical and air circuit included in the device of Figure 1 for effecting an automatic blowing down of the lower portion of the boiler.

Figure 6 is a view similar to Figure 1 illustrating a modified embodiment of the invention wherein the boiler can be blown down from the top and bottom portions thereof and also indicating a modified positioning arrangement of the feed water inlet to the boiler.

Figure 7 is a diagrammatic plan view and wiring diagram illustrating the electrical and air circuits of Figure 6.

As shown on the drawings:

In Figures 1 and 2 the reference numeral 10 designates generally a locomotive having the usual boiler shell 11 defining a boiler course 12. Plates 13 are mounted inside of the boiler shell 11 to define a fire box 14 at the rear end of the boiler. Fire tubes 15 extend from the fire box 14 through the boiler course 12 beneath the surface of the boiler water B. W. therein.

The usual engineer's cab 16 is mounted around the rear end of the boiler.

The boiler shell 11 has an opening 17 in the top thereof covered with a cover 18 providing the usual steam dome 19 above the top of the boiler.

A steam outlet pipe or dry pipe 20 extends upwardly into the steam dome 19 and has the open end thereof spaced beneath the top of the cover 18. The dry pipe extends forwardly along the boiler course to the superheater equipment, operating cylinders and the like appurtenances of the locomotive for supplying steam thereto.

According to this invention an elongated open ended trough 21 is suspended in the steam space S. S. of the boiler by means of straps 22 secured inside of the boiler shell. The trough 21 is preferably suspended in the transverse center of the steam space and, as shown in Figure 2, is of materially less width than the width of the steam space. The trough can be wider than shown particularly in installations where the steam dome is near the fire box. The trough is mounted in parallel relation with the boiler course 12 and has the rear open end thereof positioned closely adjacent the fire box defining plates 13. The other open end of the trough extends forwardly of the steam dome 19. The trough thus defines a localized course or passage 23 communicating with the boiler water B. W. adjacent the fire box and forwardly of the steam dome about level with the top of the fire box 14.

One or both side walls of the trough 21 can have openings therein immediately under the steam dome 19. These openings are closed by doors such as 24 to permit access to the interior of the boiler from the opening 17 in the top of the boiler shell.

The ends of the side walls of the trough are flared outwardly as at 25 to provide inlet and outlet mouths for the trough.

Since the hottest portion of the boiler course is adjacent and above the fire box 14, the normal flow of water in the boiler is toward the front end of the locomotive. By arranging the level of the bottom of the trough about on the same plane with the top of the fire box, the trough is adapted to receive boiler water at the rear end thereof and direct this water under the steam dome to a point forwardly of the dome where it is discharged back to the main body of boiler water. The boiler water level in an operating locomotive boiler is always maintained above the top of the fire box so that the bottom of the trough will always be submerged in water. Foam F developed on top of the boiler water as well as light water developed throughout the upper portion of the boiler water likewise flows into the rear end of the trough.

Since the passageway 23 provided by the trough is localized from the main body of boiler water, and since the side walls of the trough are disposed above the normal boiler water level and extend into the steam space, no steam generation occurs in the trough. The foam and light water flowing through the passageway 23 will break down and collapse. Therefore, as shown in Figure 1, a foam level is not maintained in the trough and only solid water is discharged out of the front end of the trough. The provision of a localized course in the main boiler course thus effects a breaking down of light water and foam.

Since the water flowing through the localized course 23 is taken from the top portion of the main body of boiler water at the hottest portion of the boiler, and since foam and light water development in the boiler is greatest at this hot portion, the material flowing through the course contains the highest concentration of electrolytes and alkalies. It has been found that these electrolytes and alkalies concentrate in the light water and foam at the top of the boiler water.

According to this invention feed water F. W. is sprayed into the localized course 23 for intimate mixing with the concentrated water and collapsed foam in the course. For this purpose a spray head 26 is suspended in the steam space of the boiler from a feed pipe 27 projecting through the top of the boiler shell immediately in rear of the steam dome 19. The spray of feed water F. W. ejected by the spray head 26 is impacted downwardly on top of the water in the course 23 at a point where the foam and light water has collapsed. The sprayed feed water intimately mixes with the water flowing through the course and is rapidly heated by this water. Since the water flowing through the course is taken from the hottest portion of the boiler, a preheating of the feed water is effected before the same enters the main body of boiler water. Likewise, since the collapsed foam and light water flowing through the course 23 contains a high concentration of electrolytes and alkalies, the newly introduced feed water, being intimately mixed therewith, will effect a precipitation of scale forming ingredients in the trough. At the same time the water hardening ingredients of the feed water are sludged to effect a flocculation of the ingredients.

The intimate mixing of the feed water with the highly concentrated water in the boiler will effect a rapid transition of the pH value of the feed water to an increased pH value thereby minimizing chances for adsorption of organic substances on dispersed matter in the water. This minimized adsorption reduces the foaming tendency of the water finally supplied to the main body of boiler water and inhibits the formation of surface active substances. The water introduced to the main body of boiler water is thereby preconditioned.

For example, the average pH value of feed water is about 8.5. The average pH value of the concentrated water flowing the course 23 is materially higher and will raise the pH value of the mixture finally discharged out of the course into the main boiler water to approximately 12.5 or more.

If the feed water contains colloidal oil incorporated therein from the feed water heaters, exhaust steam injectors, pumps or other appurtenances, the concentrated water in the course 23 will effect a "salting out" of this oil. This is caused by the electrolytes in the concentrated water. The oil will be simultaneously adsorbed or agglomerated in the flocculated alkaline compounds or precipitates being formed, thereby removing the deleterious oil.

The preheating of the feed water in the localized course 23 prevents temperature stratifications in the boiler which would normally effect stresses on the boiler shell. Leakages of the boiler are thus minimized.

Since the trough 22 has an unobstructed open top and extends from the fire box portion of the boiler to and beyond the steam dome, a clear passageway is provided for steam from the fire box portion to the steam dome. This prevents entrainment of moisture in the steam due to reduced steam velocity.

As also shown in Figure 1, the feed water F. W. is supplied to the spray head 26 through a pipe line 27 from a pump 28 mounted on the outside of the boiler shell. The pump 28 is fed from a feed pipe 29 communicating with the water tank of the locomotive tender. Of course injectors or other appurtenances can be embodied in the line 29.

As shown in Figures 3 and 4, the spray 26 includes a frusto-conical housing 30 having the small end thereof receiving the pipe 27. The large end of the housing has a solid disc 31 mounted therein by means of radially extending feet 32 which are secured to the housing. The disc is thus supported in the central portion of the housing mouth and provides narrow passages 33 for the ejection of water in spray form.

As best shown in Figures 1 and 5, a short electrode 40 projects through the top of the boiler shell 11 into the steam space of the boiler above the trough 21 in spaced relation from the ends of the trough. The electrode 40 is preferably positioned at a point where the foam in the collapsing trough 21 therebeneath approaches a collapsed condition as shown in Figure 1.

A long electrode 41 projects from the top of the boiler shell 11 towards the trough 21 at the inlet mouth thereof. The long electrode 41 terminates about level with the tops of the side walls of the trough. The short electrode 40 terminates in spaced relation above the tops of the side walls of the trough but below the steam outlet opening 17 of the boiler. The electrodes are electrically insulated from the boiler shell. A battery 44 or other source of electrical current is grounded to the boiler shell through a wire 42 and is also connected through a wire 43 to a multiple relay switch 45 having one arm 45a thereof capable of establishing connection with a wire 46 to the electrode 41. The relay 45 is mounted in an electric signal box 47 which is secured on a bracket 48 in the engineer's cab 16.

When connections are established by the electrode 41 contacting the foam or light water in the boiler, current flows through the ground wire 42, the foam, the electrode 41, and wire 43 to close the switch arm 45a. Current will then flow through a lower light 49 in the box 47 to indicate to the engineer that foam has reached the level of the electrode. At the same time the closed arm 45a of the relay 45 permits flow of current to a solenoid valve 50 through an electrical connection 51 with the box 47. The solenoid of the valve is also grounded on the boiler shell. If desired a time delay switch can be incorporated in the assembly between the foam meter box and the solenoid 50 so that the solenoid will not be actuated until after a definite elapsed time from the initial contact of the foam with the long electrode. The solenoid valve 50 receives compressed air from an inlet pipe 52 which can be supplied from the air cylinder of the locomotive (not shown). When the electrical current operates the solenoid to open the air valve, this compressed air will flow through a pipe 53 to actuate a blow-off valve 54 communicating with the lower portion of the boiler. Sludge water will be discharged through the valve into a discharge pipe 55 communicating with a steam separator 56 mounted on top of the boiler. Steam is flashed from the sludge water and discharges through the steam outlet 57 of the separator. The water is discharged through a drain line 58 extending down toward the road bed beneath the locomotive. A spray head 59 is preferably mounted on the end of the drain line 58 so that the sludge water is eliminated with harmless force on the road bed.

The short electrode is connected to the indicating box 47 through a wire 60. When the foam level in the boiler rises to an unsafe condition and contacts the short electrode 40, a danger light 61 is turned on by automatic closing of the arm 45b of the relay 45 to indicate to the engineer that the automatic discharge of foam is not proceeding at a rate sufficient to hold the foam beneath a dangerous level in the boiler. The engineer will then either open a manually operated blow-off (not shown) or will cut down on the steam demand of the boiler to depress the foam development.

From the above descriptions of Figures 1 to 5 it should be understood that the open ended and open topped trough 21 defines a localized water course in the steam space of a boiler receiving boiler water from the hottest point in the boiler adjacent the fire box and at a level wherein foam producing and foam stabilizing substances are concentrated. The water flows through the localized course where it is admixed with make up or feed water and the mixture is discharged back to the main body of boiler water at a point forward of the steam outlet from the boiler. The localized course defined by the trough is not a steam generating area so that light water and foam entering this course will collapse as it flows therealong. In the event that the light water and foam develops to a certain predetermined level in the boiler (usually established at 1 to 3 inches above the top of the water glass) an automatic blowing down of the lower portion of the boiler is effected. If this automatic blow down is not sufficient to stop the development of foam, means are provided to indicate to the engineer that the foam has reached an unsafe level in the boiler and must be depressed to prevent moisture entrainment in the steam.

When it is necessary to conserve water in the boiler and to maintain maximum steam pressure during operating periods when the engineer finds it difficult to maintain such pressure, the blow-off may be shut off even though foam has reached a high level in the boiler. The trough of this invention will then prevent excessive foam from entering the dry pipe 20 since the foam is collapsed in the trough and flows forward therein as solid water. The excess water produced by the collapse of foam in the trough re-enters the main body of boiler water at the front end of the trough and the system of this invention thus conserves water.

Many advantages are obtained by this invention which can be summarized as follows:

(1) The localized course effects a breaking down of foam and light water.

(2) The localized course provides a free path for the flow of steam between the fire box and the steam dome, which path is unimpeded by foam development.

(3) The intimate mixture of feed water with the boiler water in the trough is rapidly effected, causes a precipitation of scale-forming ingredients in the boiler water in the trough, and prevents alkaline earth salts from forming objectionable microscopic, sub-microscopic or colloidal particles.

(4) The chances for absorption of organic substances on dispersed matter in the boiler water is minimized due to the rapid transition of the pH value of the feed water to an increased pH value for conditioning the feed water.

(5) The feed water is rapidly preheated to boiler water temperature since it is intimately admixed in spray form with water taken from the hottest portion of the boiler. This prevents temperature stratification in the boiler.

(6) If the feed water contains colloidal oil, the spraying of the same into intimate mixture with the concentrated water flowing through the localized course will effect a "salting out" of the oil due to the boiler electrolytes, thereby removing the deleterious oil by agglomeration in sludge formation.

(7) Any excessive foam development overflowing the sides of the trough is depressed without additional blow down because foam will not be entrained with the steam and will not accumulate to restrict the steam space because it collapses and flows forward in the trough as solid water.

In the modification disclosed in Figures 6 and 7 parts identical with parts described in Figures 1 to 5 have been marked with the same reference numeral. In Figure 6, however, the feed water spray 26 is mounted in front of the steam dome 19 and concentrated water in the trough is blown off simultaneously with sludge water from the bottom of the boiler. The locomotive boiler is thereby equipped with top and bottom blow offs. If desired, in some installations, the automatic bottom blow off can be eliminated.

As shown in Figure 6, the trough 22 preferably extends for a considerable distance in front of the steam dome 18 so that there is ample room for the spray head 26 in front of the steam dome. The feed water sprayed through the spray head 26 intimately mixes with the boiler water and collapsed foam flowing along the course 23 immediately before this water is recirculated back to the main body of boiler water B. W.

As also shown in Figure 6, a down pipe 70 depends from the top of the boiler shell 11 into the trough 22 in spaced relation from the ends thereof and terminates near the bottom of the trough. The down pipe is preferably positioned at a point spaced from the ends of the trough where the foam has had a sufficient length of travel in the trough to become collapsed into solid water and rearwardly of the feed water spray. The down pipe 70 communicates with a blow off valve 71. This blow off valve is operated by compressed air supplied from a tube 72 communicating with a solenoid operated air valve 73 receiving air from the supply line 52 in the same manner in which the bottom blow off 54 is supplied with air from the solenoid operated air valve 50.

The blow off 71 discharges through a pipe 74 into the steam separator 57.

The short electrode 40, besides being connected to the top lamp 61 in the indicating box 47 is also connected through a wire 75 with the solenoid in the valve 73. When foam reaches the level of the short electrode 40, contact is established to energize the valve 73 for flowing air through the tube 72 to open the blow off 71. Steam pressure in the boiler will thereupon force water in the trough 22 up through the down pipe, into the separator 56 where it will be admixed with sludge water from the blow off 54, freed of steam, and discharged with harmless force to the road bed through the drain line 58.

In the modification shown in Figures 6 and 7, therefore, the short electrode does more than merely indicate an unsafe level for the foam since it automatically effects the opening of a top blow off valve 71 and causes a rapid discharge of concentrated boiler water from the trough 22. This rapidly decreases the concentration of foam producing and foam stabilizing substances in the boiler with the result that foam will rapidly subside. The top blow off comes into operation only after the long electrode has actuated the bottom blow off as described in connection with Figures 1 to 5. Obviously, if desired the bottom blow off could be omitted, or replaced with a second top blow off for the trough.

The same beneficial effect of flowing the hot concentrated boiler water along an elongated localized course and the mixing of feed water with the boiler water in this course as described in connection with Figures 1 to 5 is obtained. The mounting of the feed water inlet ahead of the steam dome has some advantages in that the feed water spray does not obstruct the free flow of steam from the hottest portion of the boiler to the steam outlet.

From the above descriptions it should be understood that the open ended trough arrangement of this invention can be used without the automatic blow off equipment if desired. As explained above, the trough eliminates the necessity of blowing off the boiler even though foam development reaches a level sufficient to overflow the sides of the trough. During temporary hard working periods of the locomotive, when the engineer finds that he must conserve water and maintain maximum steam pressure, the blow off can be shut off by an electric control switch in the cab. As the foam rises in the boiler, it is collapsed in the trough, flows forwardly therein as solid water and re-enters the main body of boiler water at the front end of the trough.

The system thus will take care temporarily of excessive water produced in the trough by the collapse of any aggravated foaming condition or high water condition such as is encountered during difficult periods of operation of the locomotive. The foam cannot reach the dry pipe since it is intercepted in the trough, collapsed and flowed back to the boiler water.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a locomotive boiler including a boiler shell defining an elongated boiler course, a fire box in one end of the boiler shell, and a steam dome on the top of the boiler shell in communication with the boiler course in spaced relation from the fire box, the improvement which comprises an imperforate elongated open topped and open ended trough extending along the boiler course and beneath the steam dome from a point adjacent the fire box to a point forward of the steam dome and having the imperforate bottom thereof submerged below the normal water level in the boiler course, and side walls on said trough projecting from said bottom into the steam space of the boiler in spaced relation beneath the top of the boiler shell, said trough defining a localized separate course within the main boiler course for the flow of water and foam from the fire box end of the boiler to a point ahead of the steam dome.

2. In a locomotive boiler including an elongated boiler shell defining a main boiler course, a fire box in one end of said shell adapted to be surrounded by water in the main boiler course, and a steam dome on the top of the boiler shell forwardly of said fire box, the improvements which comprise a foam collapsing trough defining a localized boiler course within and communicating at its ends with the main course and extending from a point adjacent the top of the fire box beneath the steam dome to a point forwardly of the steam dome, a spray device projecting through said boiler shell into said trough immediately behind said steam dome and a pump for spraying feed water through said device for rapid commingling with water in the trough.

3. The method of controlling a steam boiler which comprises tapping off from a level above the normal water level to a level below the normal water level in the boiler light water and foam developed at the top of the main body of water in a boiler into a localized passageway in the steam space of a boiler extending under the steam outlet, flowing the tapped off material for a considerable distance along said localized passageway to collapse the material, and delivering the collapsed material back to the main body of boiler water at a point remote from the steam outlet.

4. In a steam boiler including a boiler shell defining a steam space, a steam outlet and a water space, the improvement which comprises an imperforate open-ended elongated pan suspended in the upper portion of the boiler and extending in substantial parallel relation to the normal flow of water in the water space of the boiler from beneath the steam outlet to a point remote from the outlet, the bottom of said pan being submerged beneath the normal water level in the boiler and the sides of the pan projecting in spaced relation into the steam space above the normal water level in the boiler whereby the pan will receive therethrough light water from the water space, and a feed-water inlet adapted for supplying feed water to the boiler intermediate the ends of said pan for mixing the feed water with the light water in the pan to condition the feed water before it reaches the main water space.

5. In a locomotive boiler including an elongated boiler shell defining a main boiler course, a fire box in one end of said shell adapted to be covered with water in the main boiler course, a steam dome on top of said shell spaced forwardly from said fire box, and an outlet pipe projecting into said steam dome, the improvement which comprises an imperforate open-ended trough suspended from said boiler shell in the main course of the boiler defining an open-ended localized course separate from the main course and extending from the fire box beneath the steam dome to a point ahead of the steam dome for receiving therethrough light water from the main course, and means for spraying water into said localized course intermediate the ends of said trough to condition said water with the light water in the localized course before it reaches the main course.

6. The method of controlling a steam locomotive boiler having a main water course, a fire box at one end of the water course, a steam space above the water course, and a steam dome spaced forwardly from the fire box above the steam space which comprises flowing boiler water along a localized course isolated from the main course and open along its length to the steam space from a point adjacent the fire box under the steam dome to a point forwardly of the steam dome, collapsing in said course any light water and foam introduced with the boiler water, introducing feed water into the localized course and delivering collapsed foam and water back to the main course forwardly of the steam dome.

LEWIS O. GUNDERSON.